United States Patent
Kufahl et al.

(10) Patent No.: US 11,421,813 B2
(45) Date of Patent: Aug. 23, 2022

(54) OBJECT LEVELING AND SUPPORTING DEVICE

(71) Applicant: Bruce Wayne Enterprises, LLC, Wichita, KS (US)

(72) Inventors: Wayne D. Kufahl, Topeka, KS (US); Bruce L. Stubbs, Wichita, KS (US); Wayne R. Kufahl, Wamego, KS (US)

( * ) Notice: Subject to any disclaimer, the term of this patent is extended or adjusted under 35 U.S.C. 154(b) by 0 days.

(21) Appl. No.: 17/470,570

(22) Filed: Sep. 9, 2021

(65) Prior Publication Data
US 2022/0074538 A1    Mar. 10, 2022

Related U.S. Application Data

(60) Provisional application No. 63/076,652, filed on Sep. 10, 2020.

(51) Int. Cl.
*F16M 11/24*    (2006.01)
*F16M 7/00*    (2006.01)

(52) U.S. Cl.
CPC ............... *F16M 7/00* (2013.01); *F16M 11/24* (2013.01)

(58) Field of Classification Search
CPC ........... A47B 57/30; F16M 7/00; F16M 11/24
USPC ......... 248/188.2, 188.4, 188.5, 354.1, 354.3, 248/346.05
See application file for complete search history.

(56) References Cited

U.S. PATENT DOCUMENTS

| | | | | |
|---|---|---|---|---|
| 4,718,628 A * | 1/1988 | Vitta | ...................... | E04G 25/06 |
| | | | | 248/354.3 |
| 4,731,915 A * | 3/1988 | Holder | ..................... | F16M 7/00 |
| | | | | 248/679 |
| 4,733,844 A * | 3/1988 | Molloy | ............... | E04F 21/1805 |
| | | | | 248/354.1 |
| 5,169,219 A * | 12/1992 | Obbink | ................ | F16M 11/046 |
| | | | | 248/354.3 |
| 6,607,341 B1 * | 8/2003 | Wade | ..................... | A47B 96/00 |
| | | | | 187/267 |
| 6,712,433 B2 | 3/2004 | Hellwig et al. | | |
| 8,002,229 B2 * | 8/2011 | Hewson | .............. | E04G 21/3233 |
| | | | | 248/410 |
| 8,162,280 B2 * | 4/2012 | Yu | .......................... | F16M 11/06 |
| | | | | 248/354.7 |
| 8,485,480 B2 | 7/2013 | Bove | | |
| 10,542,822 B2 * | 1/2020 | Blake | ....................... | B25H 3/02 |
| 2003/0230700 A1 * | 12/2003 | Kemeny | .................. | F16M 7/00 |
| | | | | 248/677 |
| 2011/0239913 A1 * | 10/2011 | Chung | ..................... | B25H 1/18 |
| | | | | 108/146 |

* cited by examiner

*Primary Examiner* — Bradley Duckworth
(74) *Attorney, Agent, or Firm* — Erise IP, P.A.

(57) ABSTRACT

Disclosed is a system for leveling an object, e.g., cabinet, bathroom divider, using a system that is contained in a box that is splitable into two symmetrical halves. Each half has a clutch operated vertically-adjustable support member with a threaded upper end. Extension members of various lengths can be used to accommodate the need for different supporting heights. Regardless of whether an extension member is used or not, a clutch release allows the support to be raised to approximately the right height on each side underneath the object, and then a thumb-screw operated system allows for fine tuning. The system can be used to support and level heavy objects by a single worker.

19 Claims, 16 Drawing Sheets

OBJECT LEVELING AND SUPPORTING DEVICE

CROSS-REFERENCE TO RELATED APPLICATIONS

This application claims the benefit of U.S. Provisional Patent Application No. 63/076,652 filed on Sep. 10, 2020, the entire contents of which are incorporated herein by reference.

BACKGROUND OF THE INVENTION

1. Field

The disclosed embodiments relate generally to the field of construction. More specifically, the field of the invention relates to the level supporting of fixtures and other installations.

2. Description of the Related Art

In construction and other disciplines there is often the need to temporarily support articles and then level them during an installation process. Oftentimes the articles being installed are heaving and bulky, for example, bathroom stall dividers, kitchen cabinets, etc. To install this sort of heavy awkward item it is normally necessary to have the help of persons to hold and move the item until it is in the proper location, and then at least one more person to level and fasten the item in place. In this scenario, the third person might use a bubble or laser level to ensure a horizontal orientation.

Once an appropriate orientation and object location (relative to a wall or pilasters) are found, that same person must then fasten the object being installed with the others still holding the item in place. All of this can take a considerable amount of time. Furthermore, other necessary actions, e.g., using shims to space portions apart from a wall, further complicate the installation process.

Some hardware systems have been implemented for leveling cabinets and other items are known. For example, U.S. Pat. No. 8,485,480 issued to Bove discloses a cabinet leveling device (that is not used prior to fastening) that receives two cabinet sidewalls into channels connected to an intermediate section, the intermediate section including an adjustable threaded member used for height adjustment.

The use of screw-adjusted feet to level tables and other similar items is known in the art. For example, U.S. Pat. No. 6,712,433 issued to Hellwig et al. shows such an arrangement.

SUMMARY

Disclosed is a system for supporting one or more objects. In embodiments, the system includes a base, and has a supporting mass mounted on the base. In embodiments, a vertically-adjustable support member extends up from the mass and includes an adjustment system. The adjustment system is configured to allow for the raising and lowering of the vertically-adjustable support member in a first mode, the then hold the vertically-adjustable support member in place in a second mode. In embodiments, the adjustment system includes a clutch arrangement where the clutch is released to impart the first mode, and engaged to impart the second mode.

Embodiments also include a fine-tuning arrangement in the adjustment system. The fine-tuning arrangement includes a drive mechanism received onto the mass and coupled to the vertically-adjustable support member. The arrangement is configured to raise or lower the vertically-adjustable support member as a result of a user action, in embodiments, enabled using a thumb screw arrangement. In embodiments, the drive mechanism includes a threaded rod supported by the mass and received by reciprocating threads on a portion of the adjustment system that is coupled to the vertically-adjustable member. In embodiments, the threaded rod includes a thumb-screw actuator that receives the user action. In still further embodiments, the fine-tuning arrangement is operable even when the adjustment system is in the second mode.

In embodiments, the system can include a protective device configured to be secured atop the vertically-adjustable support member. The protective device can be configured to engage an undersurface of a supported item and configured to protect the supported item from damage.

At least one extension member can be configured for installation onto the vertically-adjustable member to extend the height of the extension member. In some versions, a coupler is configured to connect an end of the extension member to a top of vertically-adjustable member. In still further embodiments, the coupler has internal threads that receive a threaded top of the vertically-adjustable member from below and receive a threaded end of the extension member from above.

In yet further embodiments, a plurality of extension members may be utilized. Each of these extension members have different lengths and are configured for installation onto the vertically-adjustable member. The plural extension members enable a user to extend the vertical height of the vertically-adjustable member to a different extended height.

In yet further embodiments, the system includes a fine-tuning arrangement. The fine-tuning arrangement includes a drive mechanism that is received onto the mass and coupled to the vertically-adjustable support member. It is configured to raise or lower the vertically-adjustable member and a selected extension member from the plurality as a result of a user action.

In other embodiments, the systems discussed above are incorporated into a tandem arrangement where the system includes first and second corresponding portions. Each of the two portions, in embodiments, has a base and a vertically-adjustable support member extendable upwards relative to the supporting base. An adjustment system for each corresponding portion is included that allows for the raising and lowering of the vertically-adjustable support member in a first mode, the adjustment system configured to hold the vertically-adjustable support member in place in a second mode; and the vertically-adjustable support members for each of the first and second corresponding portions configured to together support and level an object. In some embodiments, the first and second corresponding portions are substantially symmetrical. The corresponding portions can also be made to be secured to one another.

In other embodiments, the first and second corresponding portions are attached to one another they form a container for including a plurality of implements. The first and second corresponding portions can be configured such that when secured they together form a substantially cuboid, stackable aggregation, and they can also be made to be securable using latches.

Each of the first and second corresponding portions, when unsecured, can each include a base which rests flat on a surface above which the installation is to occur, and include an upwardly-extending mass from which each vertically-adjustable support member extends. A plurality of extension members can also be included in each of the first and second corresponding portions, each extension member in the plurality having a different length and configured for installation onto the vertically-adjustable member, each extension member in the plurality enabling a user to extend the vertical height of each vertically-adjustable member to a different extended height to level the object above the first and second corresponding portions.

A fine-tuning arrangement can also be included that includes a drive mechanism which is received onto the mass and coupled to the vertically-adjustable support member, the fine-tuning arrangement configured to raise or lower the vertically-adjustable support member and any selected and installed extension member from the plurality as a result of a user action taken regarding the drive mechanism.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
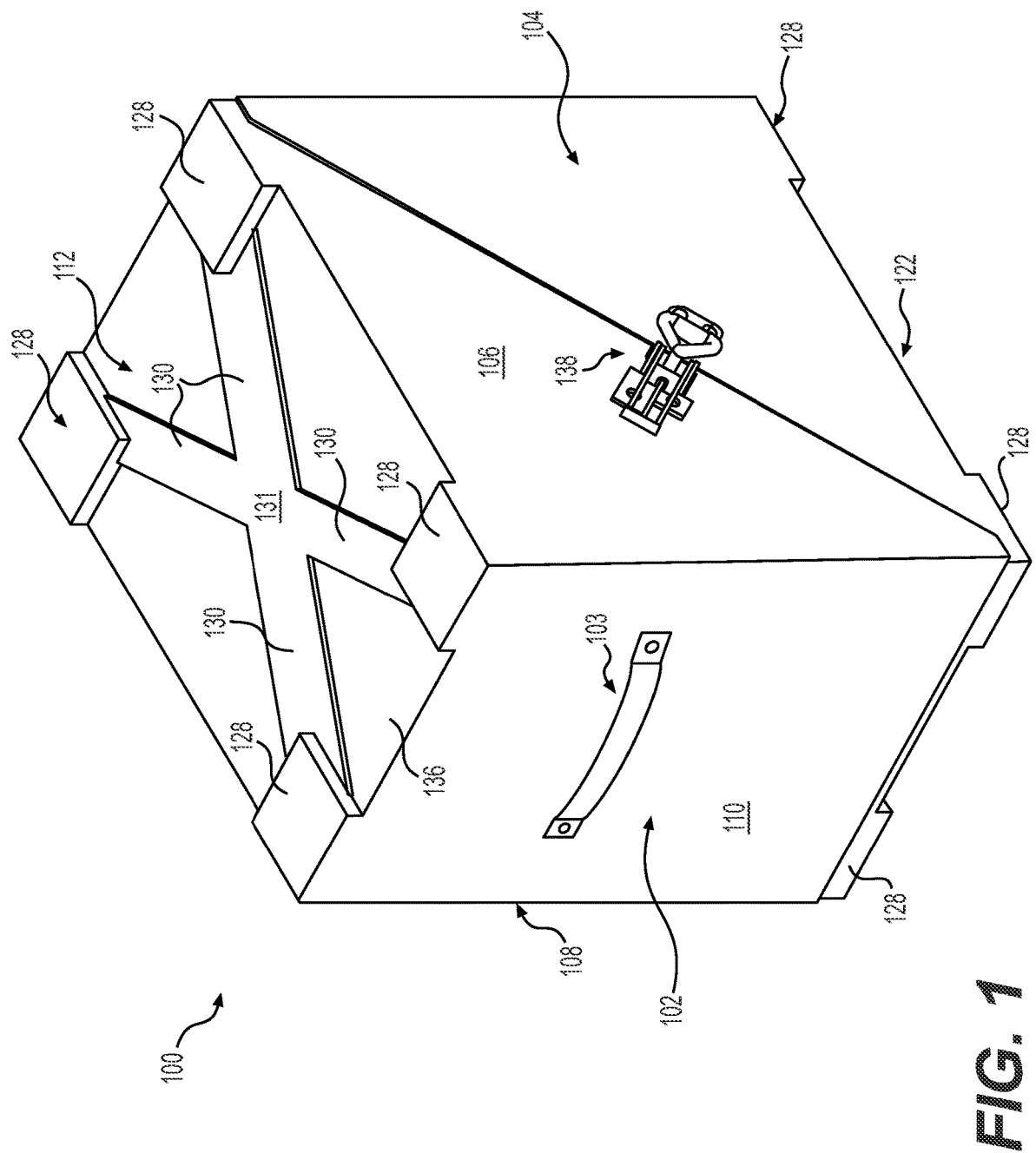
FIG. 1 is a perspective view of a first embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments provide systems and a method for supporting an article, e.g., cabinetry, restroom dividers, and other objects. Historically, these sorts of items are installed using at least three workers, at least two to support and level the article, and at least one to secure fasteners while the others try to stabilize the article in position. Generally speaking, the heavier the article, the more labor is required to fasten the thing into place. In the disclosed embodiments, securement and leveling are achieved using a dual-support arrangement using two substantially identical devices that can be latched together for transport.

More specifically, an object leveling and supporting system 100 includes two corresponding separable portions 102 and 104. In the disclosed embodiment, the separable portions 102 and 104 are substantially symmetrical halves. It should be noted that the use of the terms "corresponding," "half," or "halves" used in reference to portions 102 and 104 in this application should not be construed as limiting either term to identical (or symmetrical) structures unless expressly claimed. The terms instead should be interpreted as meaning that the devices perform comparable functions. Corresponding portions 102 and 104 can be separated from each other and either half used to support an article alone, or both halves used together to support an article. As seen in FIG. 1, corresponding portion 102 is stacked atop and latched to corresponding portion 104. The overall shape of the collective system 100, when in storage mode, is substantially square shown as a cube, which makes it easily transportable and stackable. The embodiment disclosed herein is actually not perfectly cubic, but instead is substantially in the form of a rectangular cuboid structure. Transporting is further facilitated via a handle 103, which in embodiments, is a strap-type. The two corresponding portions (e.g., halves) 102 and 104 are held together by latch arrangements 138 and 139 (the latch arrangement 139 is on the unseen side in FIG. 1, and is substantially identical to latch arrangement 138 shown in FIG. 1; the hidden latch arrangement 139 can be seen in FIG. 2). Those in the art will recognize that the overall system (an aggregation of corresponding portions 102 and 104) could be configured such that when placed in storage/transport mode, the overall shape and/or size could be different (e.g., rectangular, larger, smaller, etc.)

Top corresponding portion 102 has numerous exterior surfaces. More specifically, the top 102 has a triangular side surfaces 106 and 108, a front surface 110, and a top surface 112. Top 112, which when in use will be rested on a floor or other support surface, includes four legs 128, and reinforcing cross members 130 which meet at an intersection 131. These features are the same for the mostly symmetrical other corresponding portion 104.

Other corresponding portion 104 has the same exterior surfaces, e.g., triangular side surfaces 106 and 108 (of which, triangular side surface 108 is not visible in FIG. 1), a front surface 120 (which is not visible in FIG. 1), and a top surface 122. The two halves 102 and 104 can be separated from one another by unlatching the latch arrangements 138 and 139, and are then used together to support an article by setting them underneath the article in a spaced apart relationship (see, e.g., FIG. 2).

Figure 2:
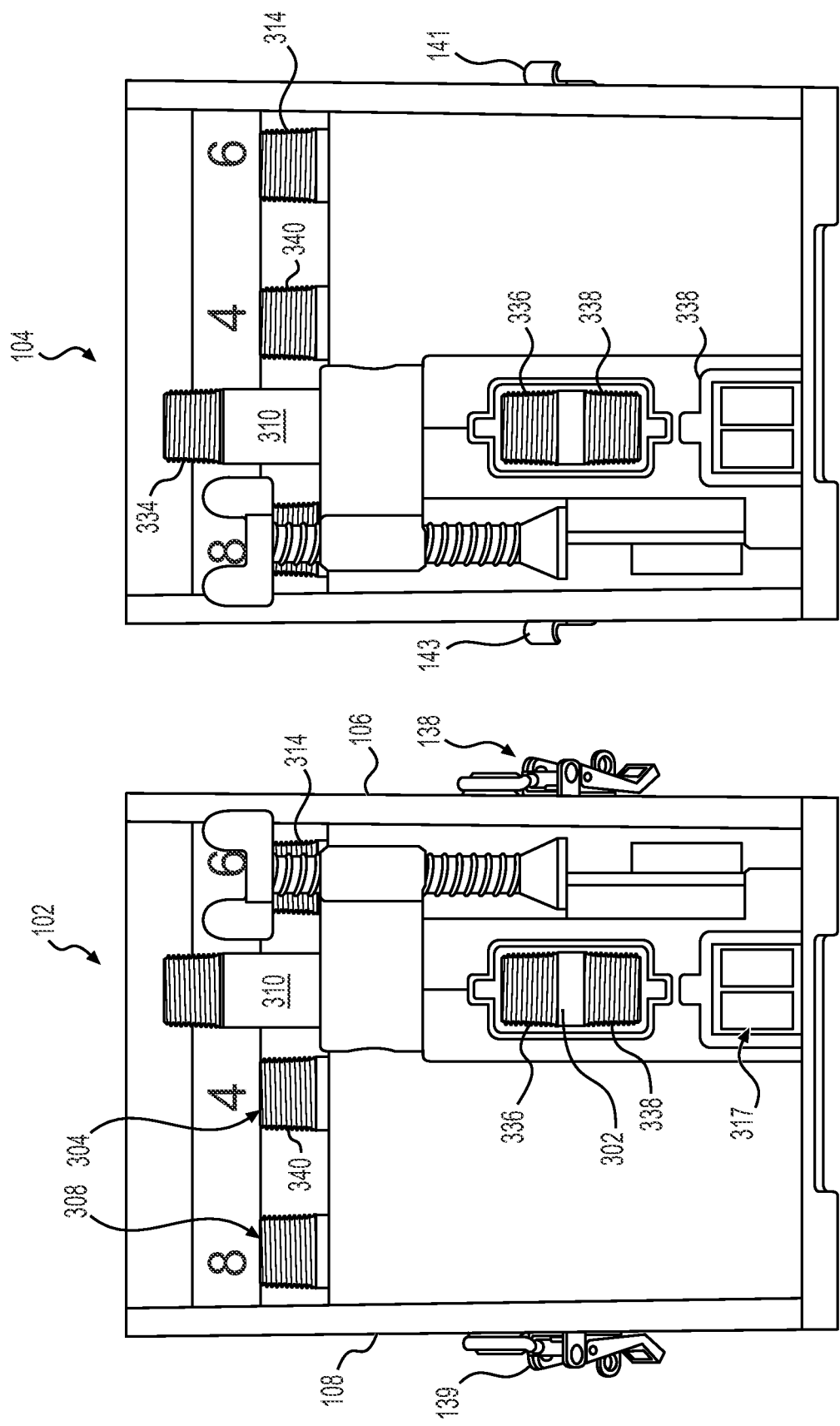
FIG. 2 is a front view showing each half of the first embodiment separated for use, and exposing the internals of each half.

Looking to FIG. 2, it can be seen that top corresponding portion 102 is able to be separated (after unlatching) and spaced apart from the corresponding bottom portion 104, both halves facing front. Upon separation, the top surface 112 (see FIG. 1) is turned over so that it is on the bottom of half 102 such that it cannot be seen in FIG. 2. The latches 138 and 139, after separation of the halves has occurred, can be seen in FIG. 2. Catches 141 and 143 for the corresponding latches 138 and 139 can also be seen in this view. Also evident in FIG. 2 is that both halves 102 and 104 are mostly symmetrical opposites when deployed. It should be understood that in the disclosed embodiment, the two halves 102 and 104 operate in substantially the same way, and operate together to support a single article above the two supporting halves 102 and 104. But it should further be understood that novelty exists even in the structures and operations of one half alone. Thus, alternative embodiments of what is disclosed could involve the use of only one support, and thus, the scope of embodiments should not be limited to the utilization of two supporting halves unless specifically claimed.

Figure 3:
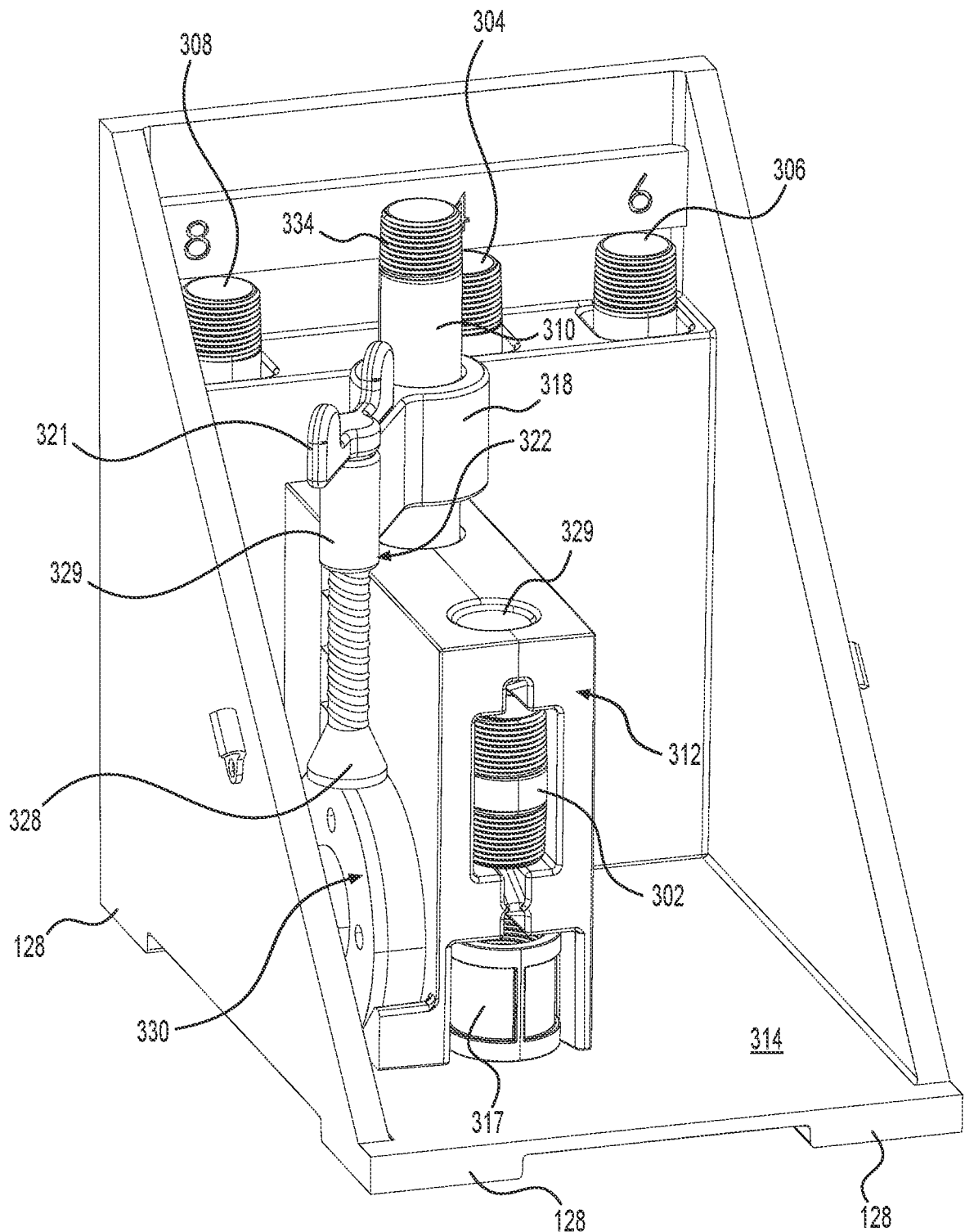
FIG. 3 is a perspective view of a half of the system.

In FIG. 3 it can be seen that half 104 has been isolated for purposes of showing the details of a process for supporting an article (not shown). It should be understood that the operation of half 102, although not specifically shown, would be, in embodiments, substantially the same structurally and functionally. As can be seen in FIG. 3, half 104 includes a primary adjustable support member 310 as well as a plurality of additional extension members 302, 304, 306, and 308 having different lengths (2, 4, 6, and 8 inch threaded pipe nipples in the disclosed embodiments). The primary adjustable support member 310 is slidably securable at different levels (translatable upward and downward) into a bore created down into a supporting mass 312, which in the disclosed embodiment is a rectangular shaped block and is secured atop a floor 314 of the supporting half 104. The term "block" is used throughout this application should not be construed as imparting any sort of cuboid, rectangular, square, or necessarily any other particular shape. The term as used herein merely refers to a thing that extends upwards from something (e.g., here, the floor 314). The primary support member 310 is included in a cylindrical pipe clamp collar 318 which includes a pipe clamp lever arrangement 316 (see FIGS. 4 and 7) enabling member 310 to be slidably repositioned and secured at different heights relative to the mass 312. Arrangements like the one shown as pipe clamp lever arrangement 316 can be referred to as "clutch lever" arrangements, and are known in the art as used in pipe clamp arrangements.

Figure 4:
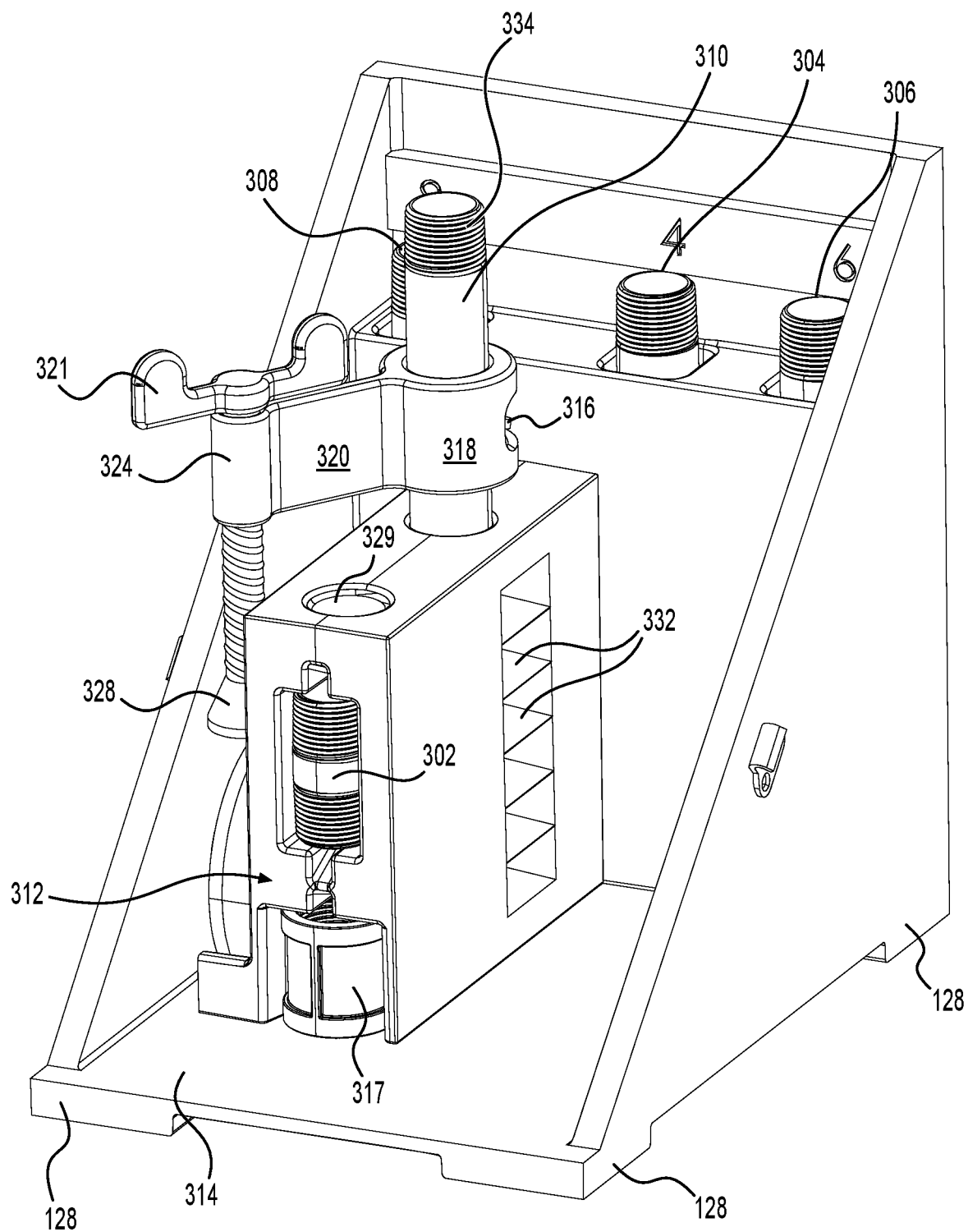
FIG. 4 is a view of the half of the system in FIG. 3, but taken from a different perspective.
Figure 7:
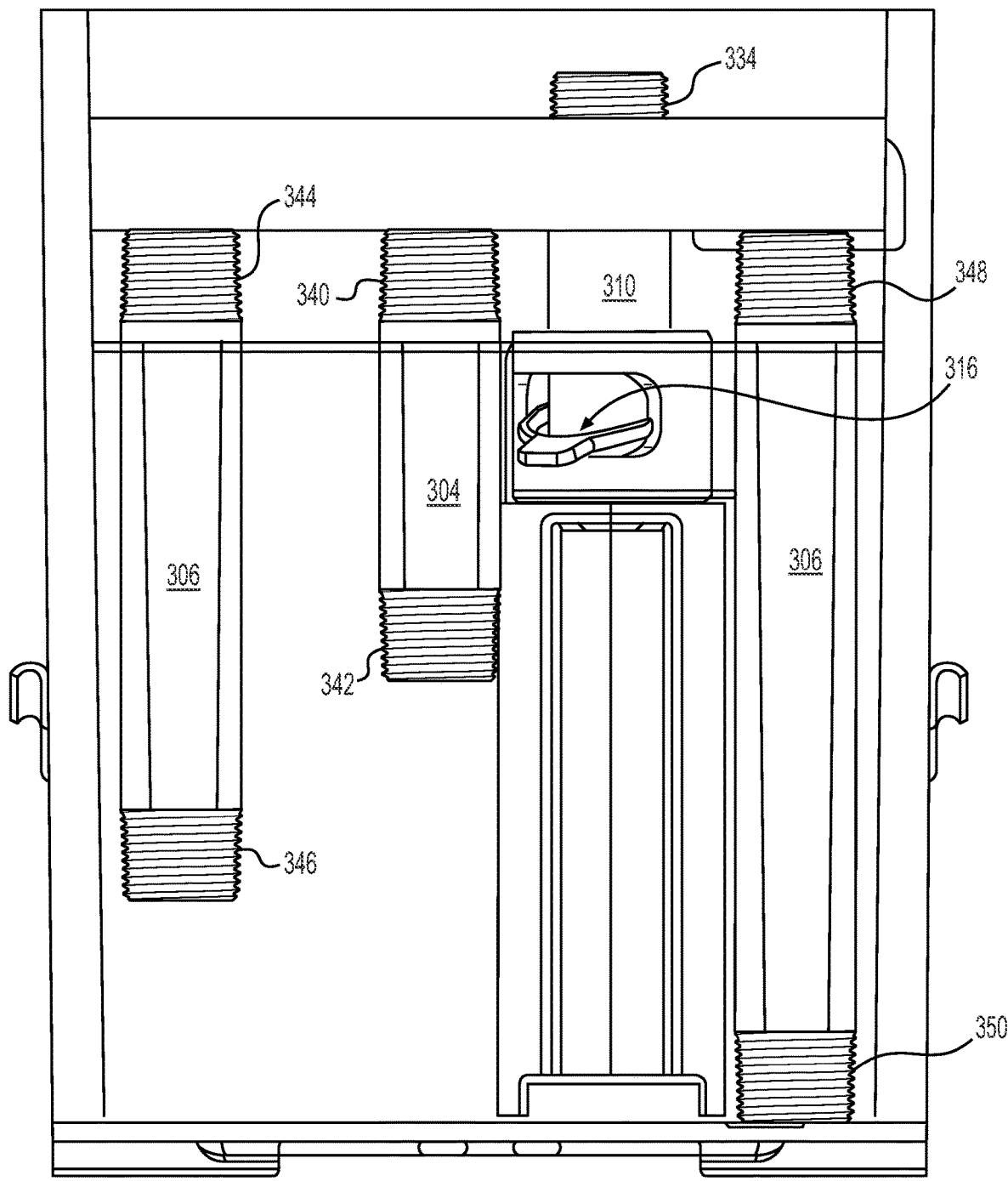
FIG. 7 is a rear view of the half shown in FIG. 3 with features ghosted to reveal internals.
Figure 8:
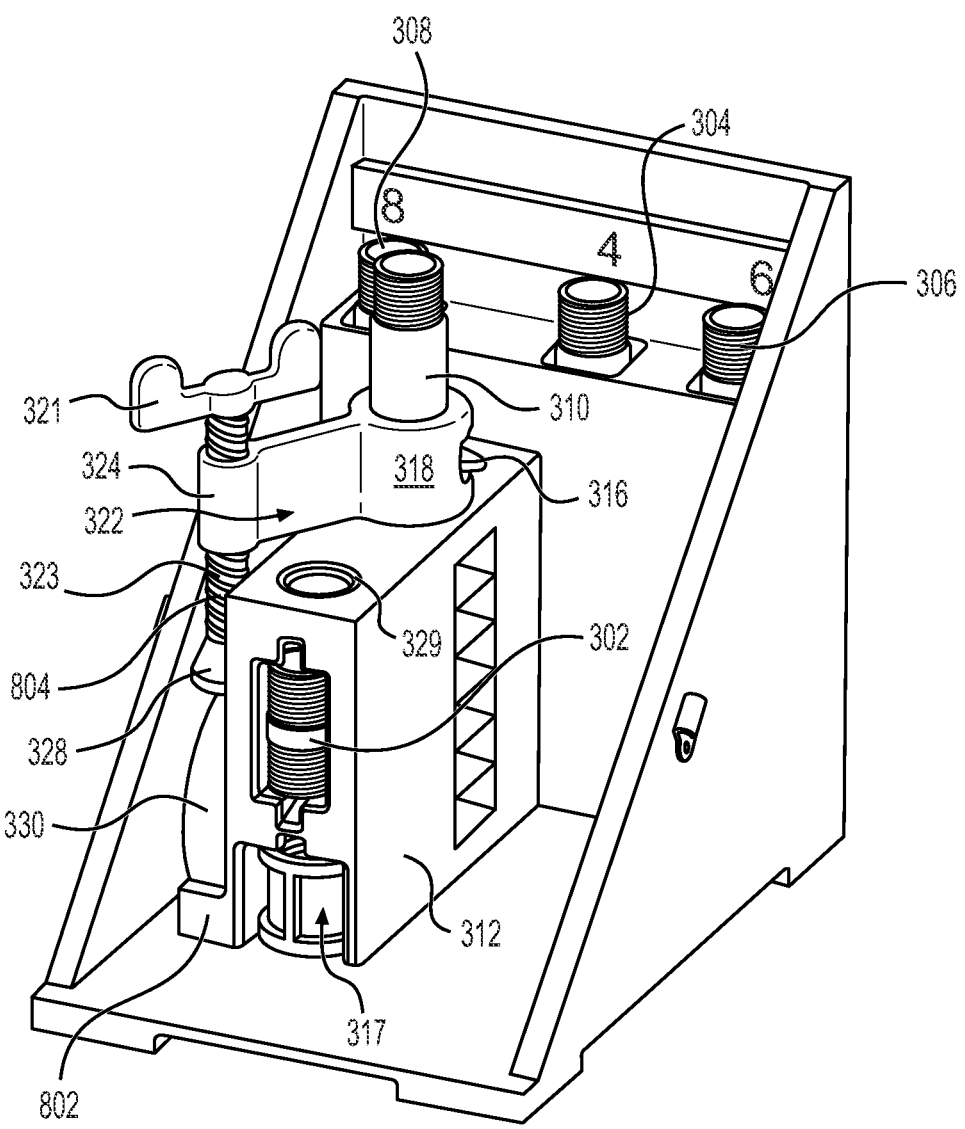
FIG. 8 is a perspective view of the half shown in FIG. 3 in an initial stored position.

Pipe clamp lever arrangement 316 (see also FIG. 7, wherein the back panel of the device is ghosted) is included in a rotatable collar 318 (see FIGS. 4 and 7). This collar 318, along with an outward extension wall 320 and internally threaded collar 324, all serve to support a fine-tuning screw arrangement 322 (see FIG. 3) which enables a head 328 to be adjusted upward or downward depending on activation of thumb activation handle 321. Activation of the handle 321 causes threads 323 on the shaft with reciprocating threads (not shown) inside collar 324 to raise or lower the head 328. This subsystem, otherwise known as a drive mechanism, will be used to finely adjust the height of the primary support member 310 as needed. To do so, the head 328 will be placed into a receiving aperture 329 which has been defined into the top of mass 312.

The system also includes an engagement disk 330. Disk 330 may optionally include a padded, cloth, rubber, or other upper surface to protect the article, provide grip, or accomplish other objectives since it will be what engages the article and directly supports it from below. The underside of disk 330 includes a threaded receptacle 331 (see FIGS. 5 and 6) which is configured to receive threads on top of the primary support 310 or the threads of any extension member (selected from the group of supports 302, 304, 306, or 308) in use as will be discussed hereinafter. For the purpose of connecting each of the extension members 302, 304, 306, or 308 atop the primary member 310, a pipe coupler 317 is made available. Pipe coupler 317 includes internal threads configured to receive reciprocating threads on the end of each of extension members 302, 304, 306, and 308 on one side, and the top thread set 334 atop the primary extension member 310. Extension members (e.g., nipples) 302, 304, 306, and 308 are threaded on both ends. More specifically, member 302 has threaded ends 336 and 338 (see FIG. 6), member 304 has threaded ends 340 and 342, member 306 has threaded ends 344 and 346, and member 308 has threaded ends 348 and 350 (see FIG. 7 in which the back panel of the device is ghosted so that the extension members can be seen in detail).

It is contemplated that engagement disk 330 may mechanically fasten to the primary support member 310 via other fastening means. For example, in one embodiment, engagement disk 330 may mechanically connect to the primary support member 310 via a rivet fastener, a ball and socket fastener, or any other fastener known to those skilled in the art. Similarly, it is contemplated that extension members 302, 304, 306, and 308 may mechanically fasten to the engagement disk 330 using other fastening means such as those listed above. In some instances, a pivotable fastener may be advantageous for the engagement disk 330 contacting the structure or article. For example, if the structure or article has a slanted base wall, a greater surface area of the engagement disk 330 may contact the structure or article, thereby creating a flush surface by which to support the structure or article.

Ultimately, when in use, the majority of an article's weight will be borne by the mass (block) 312. Because of this, the intersection 131 of the cross members 130 is centered immediately below the mass 312 for each half. This provides better support when the device is in use since the blocks 312 are also offset from center relative to each half (102, 104).

Figure 5:
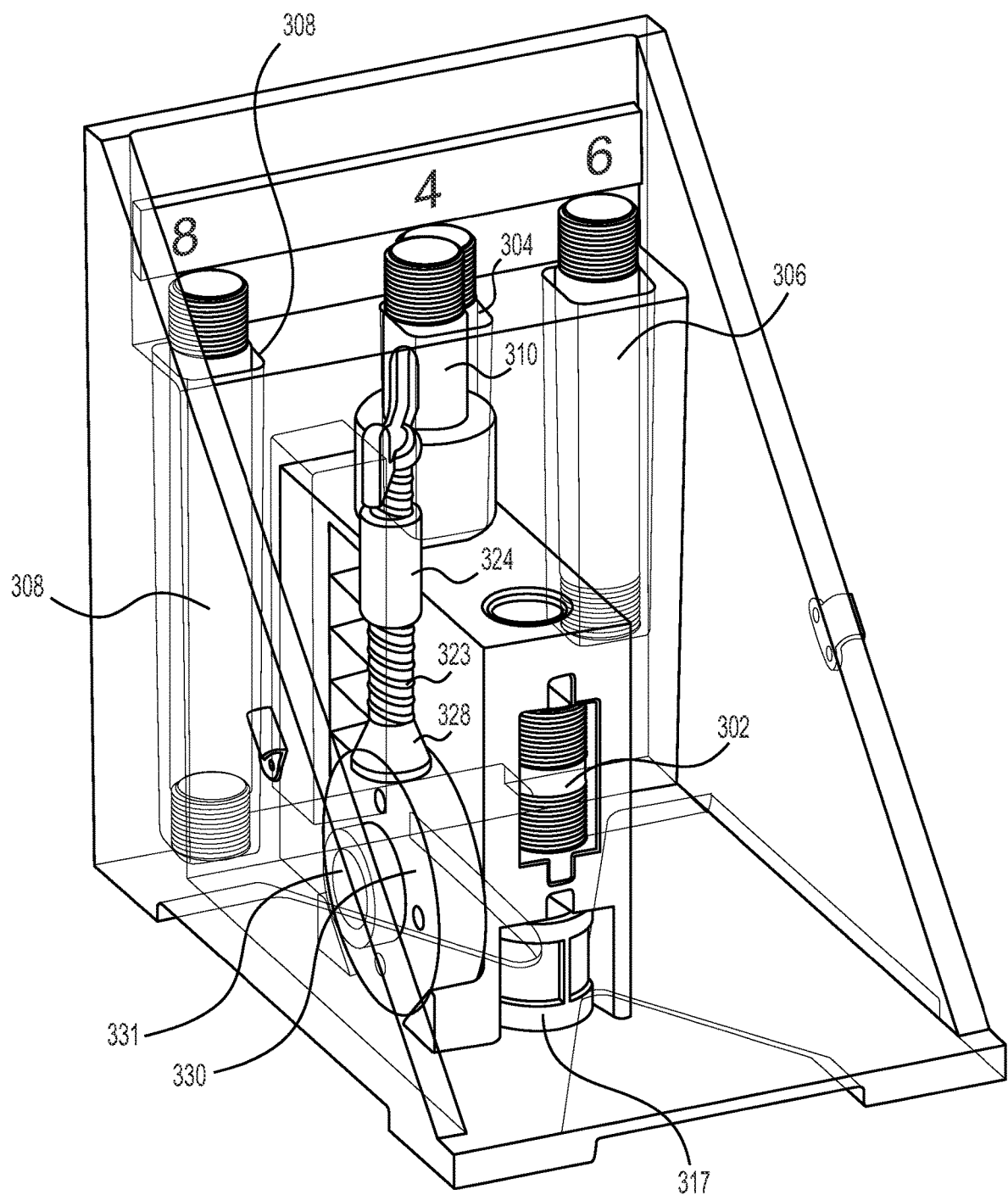
FIG. 5 is a view of the same half, and from the same perspective as in FIG. 3, but with features ghosted to reveal internals.
Figure 6:
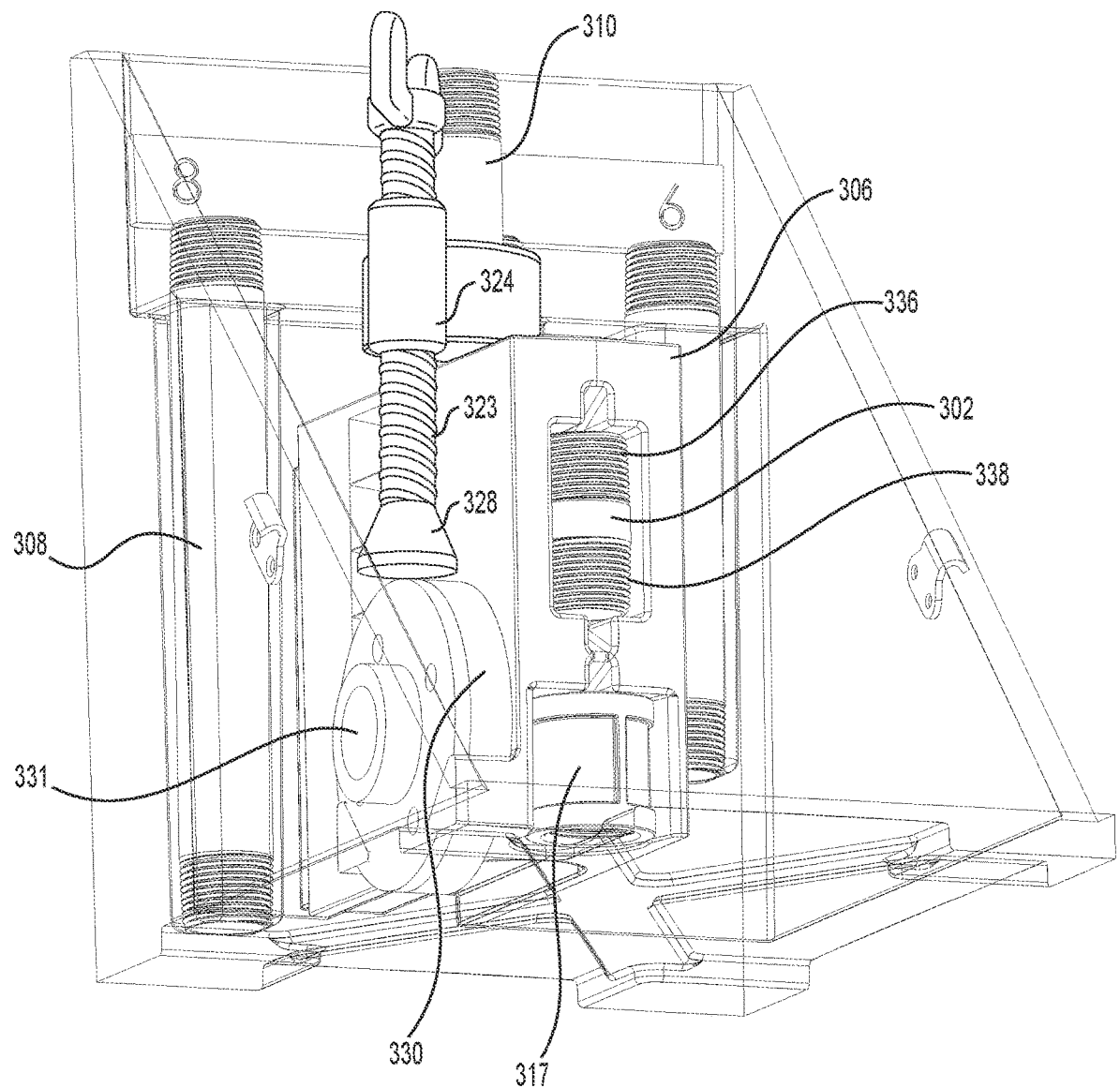
FIG. 6 is a perspective view taken of the FIG. 3 half and from below, with different features ghosted to reveal internals.

Referring to FIGS. 4 and 5, mass (block) 312, in the disclosed embodiment, includes stabilizing shelves 332 which exist on each side and extend inwardly to engage the primary support member 310. In embodiments, these stabilizing shelves 332 create a slight friction fit with the exterior surfaces of the primary support member 310 such that the primary support member 310 can be slid up and down, but will remain in a constant vertical position until pushed down or pulled up. In embodiments, the stabilizing shelves 332 may comprise a rubber, semi-rubber, or other material which causes slight friction when pressed against another material. In other embodiments, there are no shelves, and the sides of the block 312 are simply solid, or have some other configuration. Other means of providing the ability of the primary support member 310 to be manually raised or lowered while sticking in a particular vertical position could be employed as well. Further, the stabilizing shelves 332 can be angled either slightly upward or slightly downward. In more specific embodiments, every other stabilizing shelf 332 from top to bottom may be at a different angle relative to the one above it. This stabilizes the primary support member 310 structurally while also making primary support member 310 moveable up and down upon an application of force by a user's hand. Stabilizing shelves 332, however, are not the primary means by which to secure the primary support member 310 in a vertical position while supporting an article. Instead, the clutch lever clamping arrangement 316 will securely hold the primary support member 310 in a desired vertical position, but the stabilizing shelves 332 may be advantageous in certain applications. Regardless, the clutch lever arrangement 316 is then used to selectively fix the collar 318 to the primary support 310.

How the halves 102 and 104 can be utilized in operation is disclosed in FIGS. 8-15, but for the sake of simplicity, the operation of single half 104 alone is described. It should be understood, however, that half 102 will be, in embodiments, operating in a spaced apart orientation in substantially the same functional manner. It should also be understood that in other embodiments, only one half will be used to support an object.

As a preliminary to these steps, it is presumed that a worker will transport (optionally using handle 103) the system 100 to the site of an installation involving the level supporting of an article in installing/securing the article. At the location, the worker will separate the halves 102 and 104 by releasing latches 138 and 139. It is presumed that the worker will already know an intended height for installation of the article above the surface, of which the halves 102 and 104 will be used to support the article from below. For example, if the installation is to be of a cabinet above a kitchen countertop, it is presumed the worker will know or determine a proper height between the countertop and underside of the cabinet at which the installation is desired. If the system 100 is being used to support a bathroom stall divider, the user will also typically know a desired height (standard is 12 inches).

Figure 16:
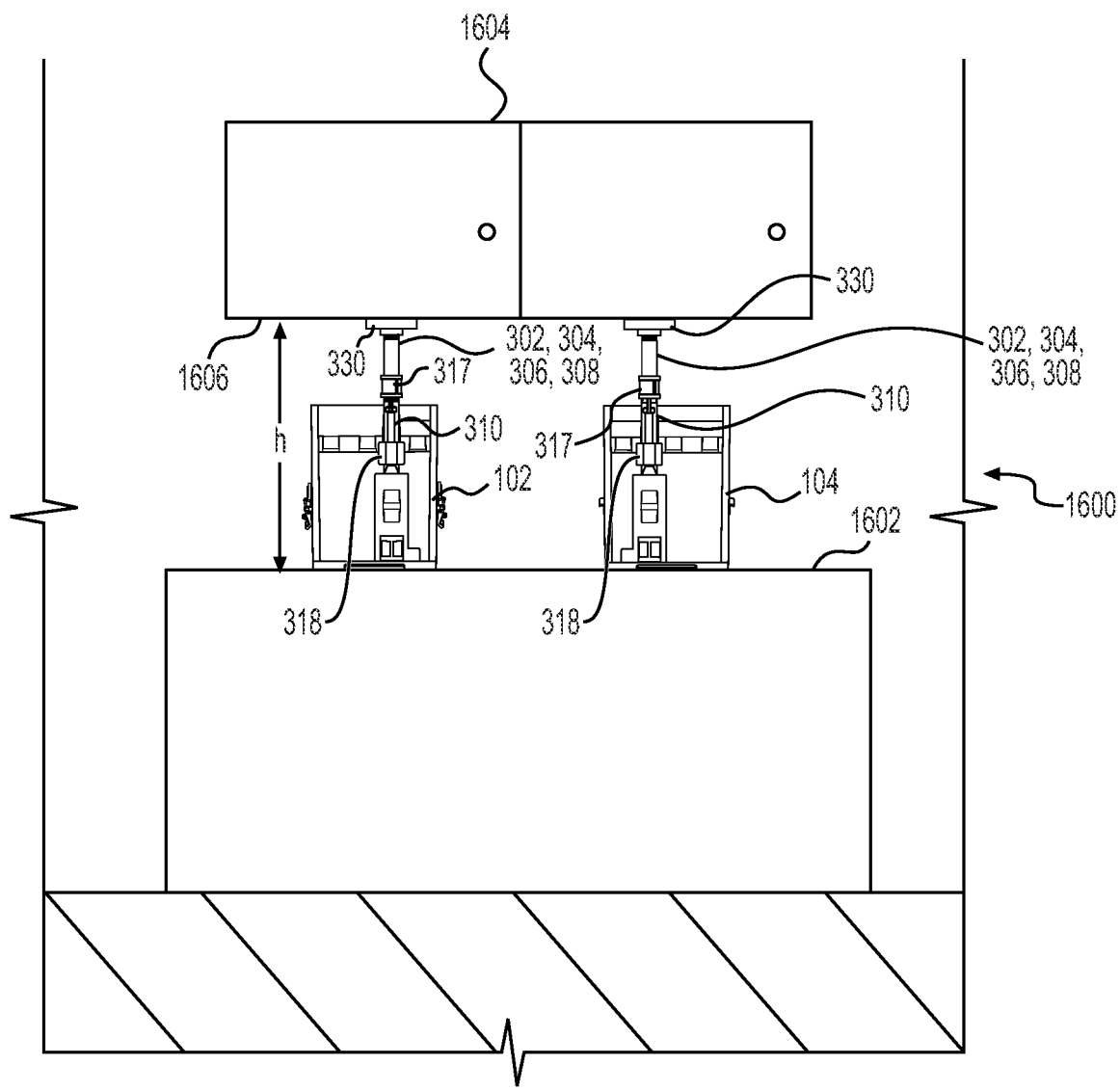
FIG. 16 shows how the halves of the embodiment shown in FIG. 1, and the details for each half revealed in FIGS. 2-15 might be employed in supporting an article.

FIG. 16 shows an environment 1600 in which the system 100 might be employed. In the figure, it can be seen that devices 102 and 104 have been place on a countertop 1602 and used to support a cabinet 1604 from underneath (by engaging under surface 1606). An intended height "h" is shown in the figure, as the distance from the countertop 1602 and the underside of the cabinet 1606.

Referring back to FIGS. 8-15, the worker will know the total height afforded in the instance only the primary support member 310 is in use, with engagement disk 330 directly attached to it (e.g., a total upward extended height of 10 inches using only the primary support 310 might enable the use of the device both for bathroom stall divider mounting or cabinetry support. That considered, the user will make a decision as to what length of extension support selected from the group of supports 302, 304, 306, or 308 might be appropriate if any (it is also possible that only the primary support 310 is needed) to be at or slightly less than the intended height "h". Thus, assuming "h" is 17 inches, the worker would know to select the 6 inch extension member 306, knowing that adjustments could be made up to the full 17 inches required.

We will now discuss each of the steps for FIGS. 8-15 in more detail using just one (support half 104) of the two support units 102 and 104. In the step shown in FIG. 8, the support unit 104 is shown as it would appear in its stored state immediately after the halves are unlatched and placed on the supporting surface (e.g., floor, countertop). More specifically, the head 328 of the fine tuning screw arrangement 322 is positioned to pin the engagement disk 330 in place behind an outwardly extending containment tab 802 (see bottom of FIG. 8). FIG. 3 also shows helpful views of this.

Figure 9:
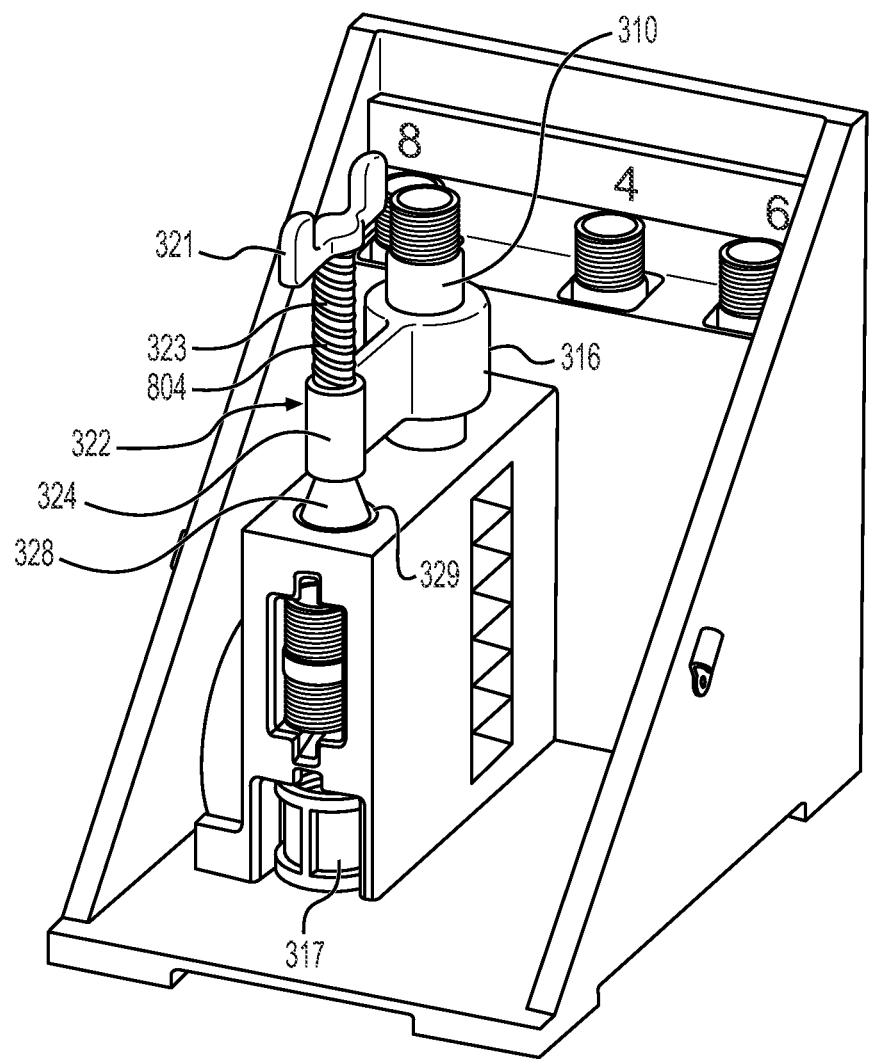
FIGS. 9-15 show the half of FIGS. 2-8 at various stages of operation during the process of supporting an article.

In a next step shown in FIG. 9, it can be seen that a user has changed the position of the screw arrangement 322 such that the head 328 has been located in the aperture 329 on top of the mass 312. The relocation is made possible by first turning the thumb activation handle 321 so that threads 323 on the rod 804 are engaged by corresponding threads inside collar 324 to raise the head 328. The user must then activate the pipe lever 316, and slightly raise the collar 318 so that the bottom of the head 328 can clear the upper surface of the mass 312. From there, the head 328 can be planted in the aperture 329 resulting in the state shown in FIG. 9.

Figure 10:
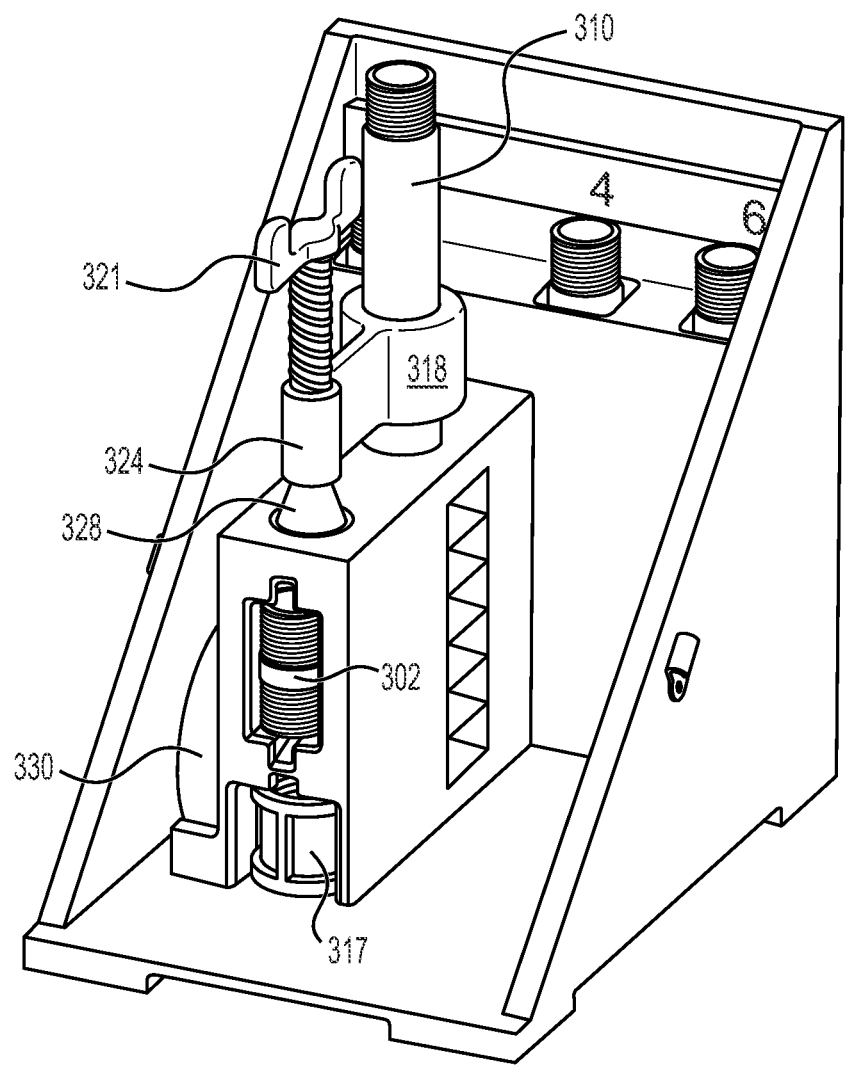

In a next step shown in FIG. 10, the primary support 310 can be released (again, by releasing pipe clamp lever 316 seen in FIGS. 4 and 7) and pulled up from the position shown in FIG. 9, to the increased height shown in FIG. 10. Using these processes, the primary support 310 is able to be raised and lowered to meet (roughly) various height requirements up to the maximum it can be extended. In this case, the stabilizing supports 332, in an embodiment, may aid in maintaining the vertical placement of the primary support 310 while the user adjusts the primary support 310 to the intended height.

Figure 11:
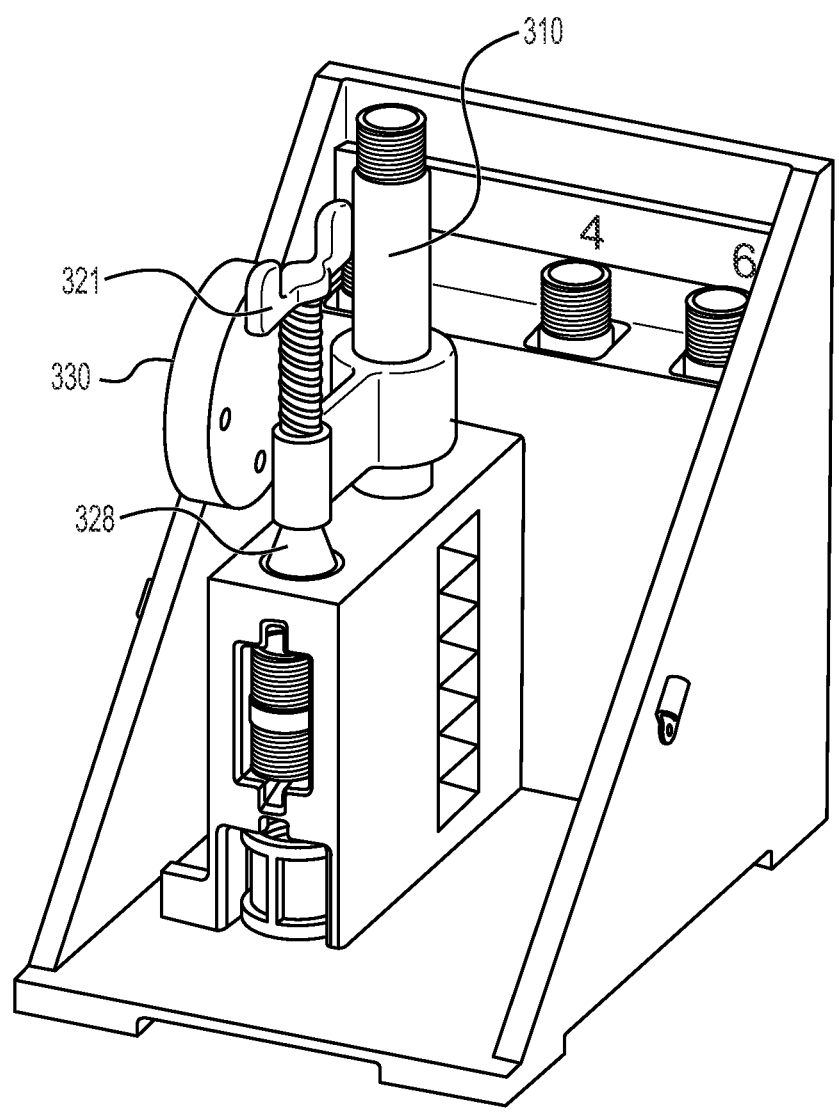
Figure 12:
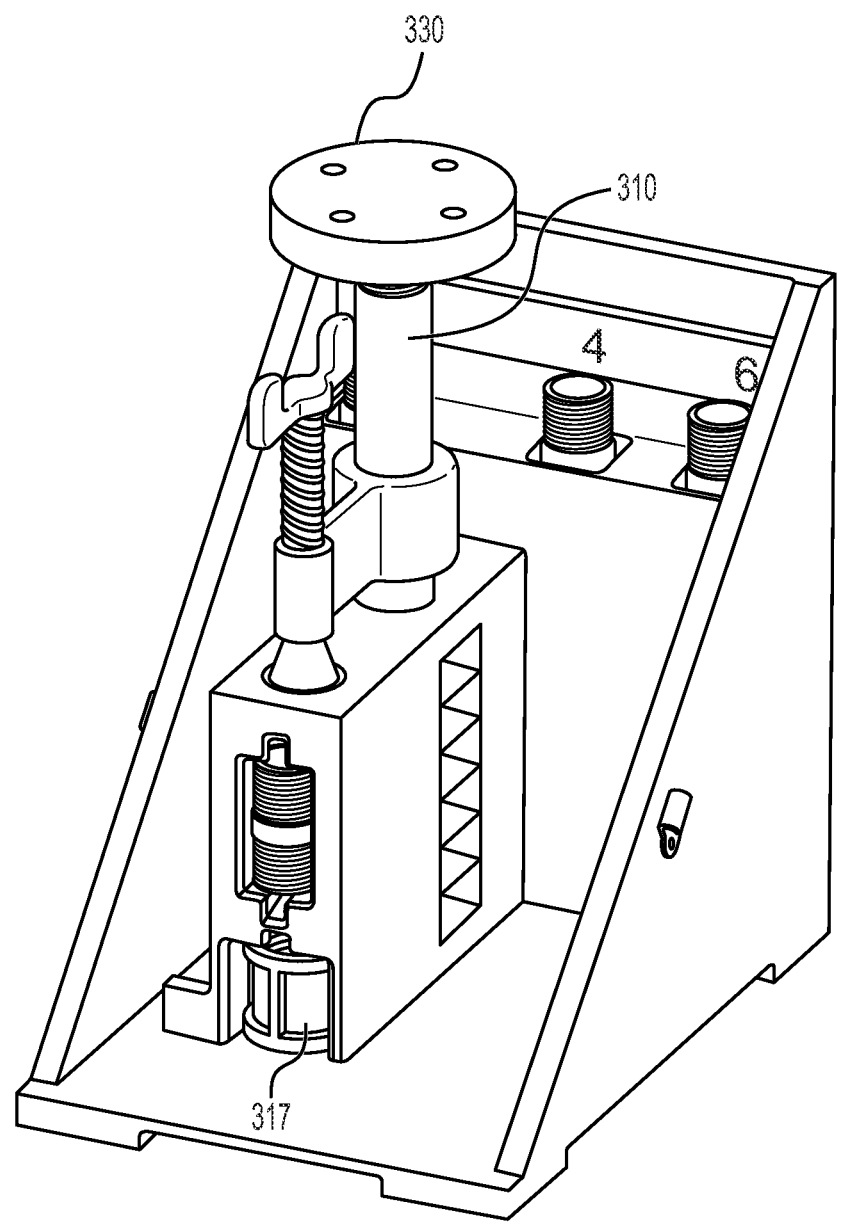

In some instances, the desired height created by the support halves 102 and/or 104 (singly or in combination) might be achievable only using the primary support 310. That process is shown in FIGS. 11-14. Referring to FIG. 11, it can be seen that the engagement disk 330 is removed from where it has been housed (see FIG. 10), and then in FIG. 12, it can be shown as it exists when it is screwed onto the support 310. To do this, the threaded receptacle 331 on the underside of the disk 330 (see FIGS. 5-7) is screwed onto the threads 334 atop the primary support 310. Once the device is in the FIG. 12 state, the user can adjust the pipe clamp lever 316 (see FIG. 7) for each half (102 and 104) to adjust the height of each half to approximately the dimension "h" already discussed. Each half then receives a portion of the load underneath the article to be supported.

Examination of FIG. 16 is helpful in understanding an environment in which this might occur, but it should be recognized that the process currently being discussed does not involve the use of any extension member (unlike what is shown in FIG. 16).

Figure 13:
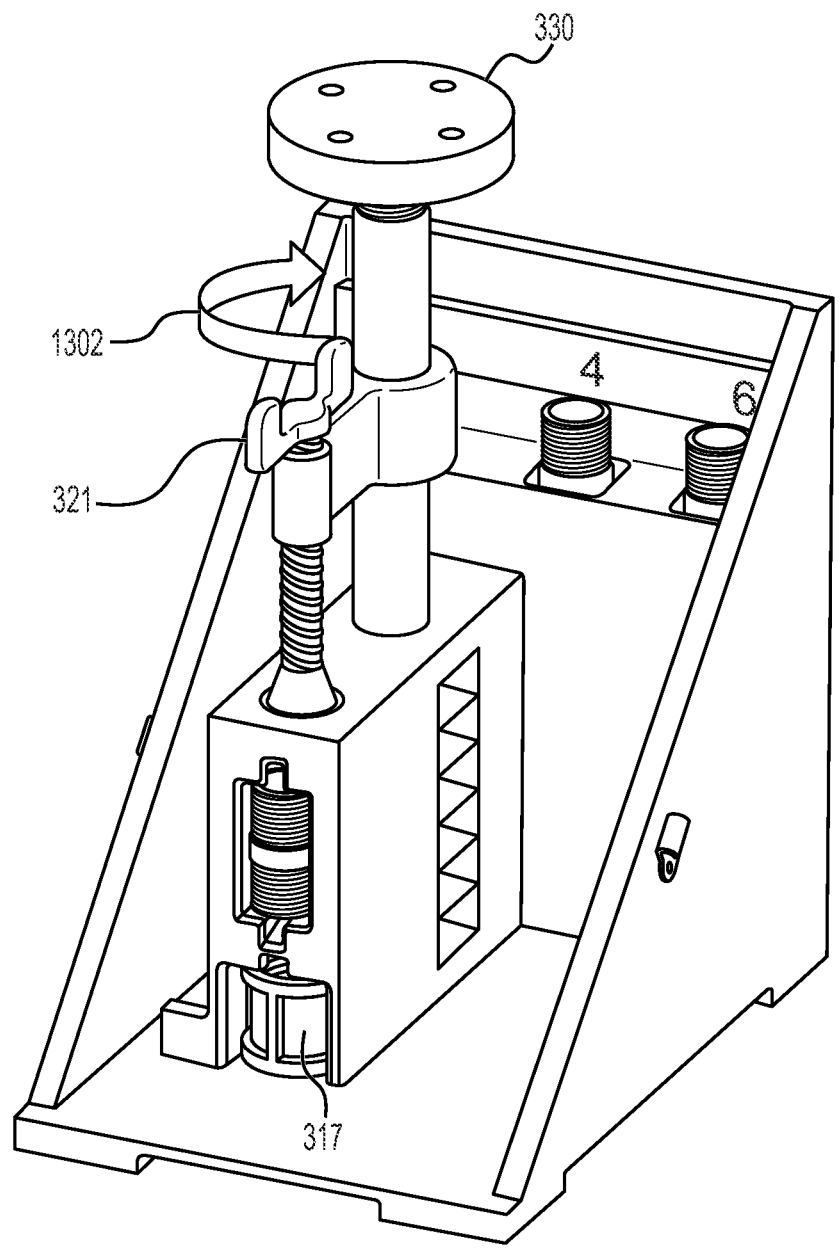
Figure 14:
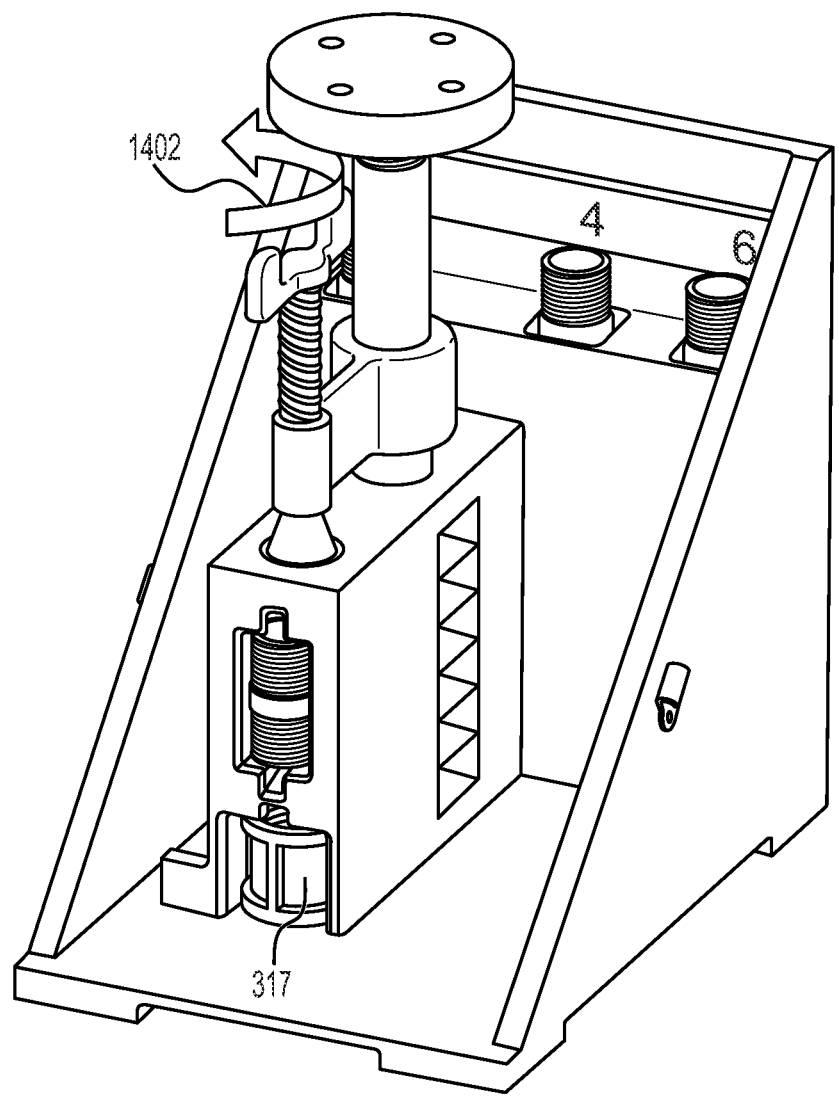

Regardless, the halves are split apart, and a level can be used on top or below the cabinet 1604 or other article (e.g., a bathroom partition) while a user fine tunes both height on each side as well as leveling by adjusting the thumb screws 321 on each half (of halves 102 and 104) to precisely adjust the cabinet (or other structure) to the desired height, and to level the structure. Because the halves 102 and 104 fully support the structure during adjustment, the entire process can be executed by a single person. FIG. 13 shows how a clockwise rotation 1302 can be used to raise the disk 330 by raising the primary support member 310, and FIG. 14 shows how a counterclockwise rotation 1402 can be used to lower the height.

Figure 15:
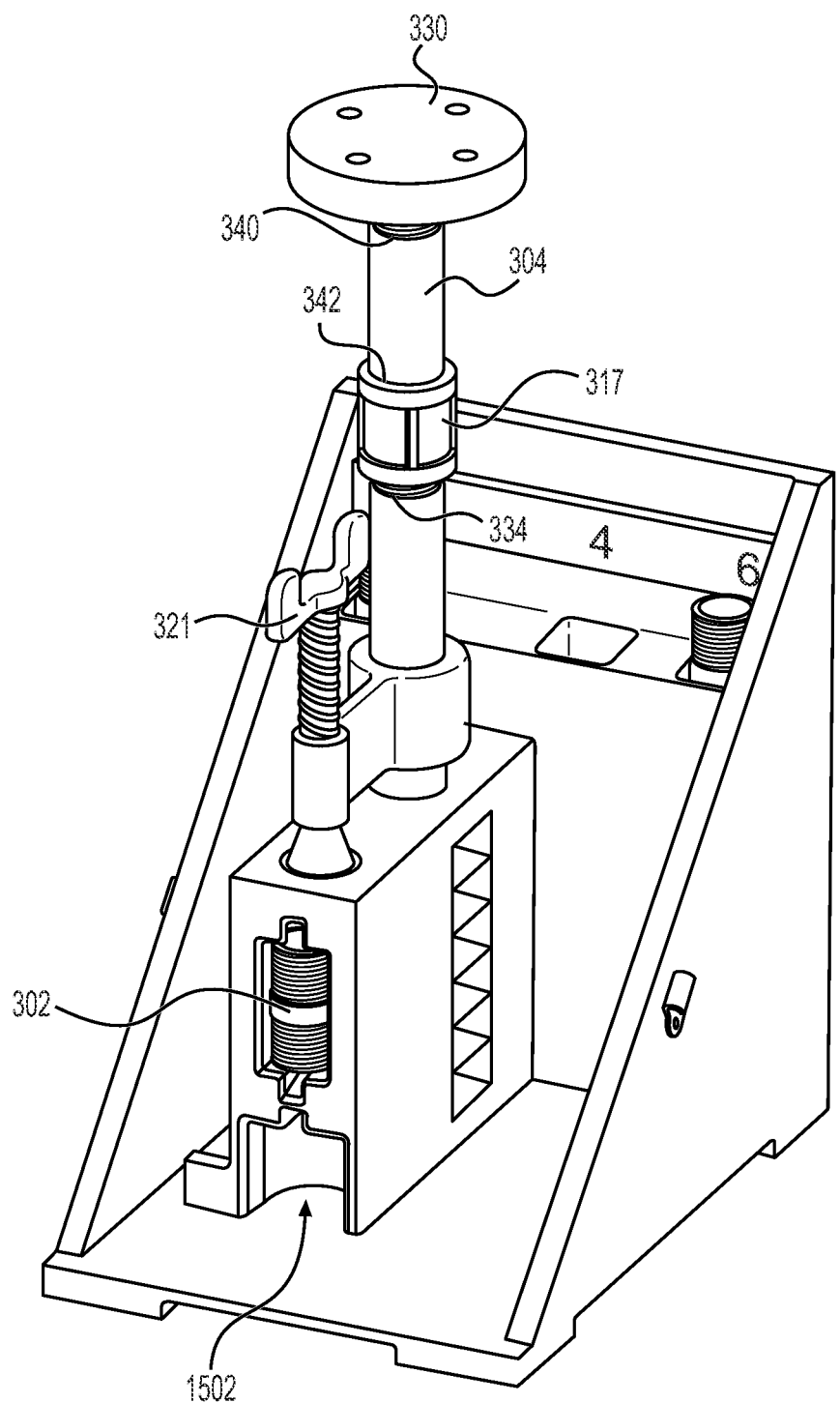

FIG. 15 illustrates how one of the supports 302, 304, 306, or 308 can be added atop the primary support 310 to further increase the height, if necessary. In one embodiment, selecting the same-length extension member may create symmetry for both halves of the support system, 102 and 104, as shown in FIG. 16, or applications installing overhead cabinets, the use of extensions is likely. In another embodiment, selecting different length extension members may create an offset height between both halves of the support system, 102 and 104. This embodiment may be advantageous when the structure comprises offset base surfaces. To do so, the user will, after executing the preliminary steps discussed already above, remove the pipe coupler 317 from a housing area 1502, and screw it onto the threads 334 atop the primary support 310 as shown in FIG. 15. Next, the user will screw the threaded end (e.g., end 342) of the desired extension support (e.g., the 4 inch support 304 has been selected in FIG. 15) into the exposed threads of the coupler 317 which is not sitting atop the primary support 310. Next, the user can screw the engagement disk 330 onto the upper threads of the extension support selected (threads 340 of selected support 304 are shown being utilized in the figure). As discussed already, the protective top of the disk 330 will prevent damage to what is being supported.

With the appropriate extension supports on each half now being selected and installed on each half 102 and 104, the user is able to roughly approximate the height for each of the support halves 102 and 104 required by releasing the pipe clamp members 316 to elevate the supports to the correct height (roughly). The user is able to then place the cabinet (or other article) atop both halves, where the article will be supported in a rough initial position. Then, the user manipulates the thumb screws 321 on each side to adjust the height of each half so that the precise height and level are obtained.

Although support 304 is shown being selected for use in FIG. 15, those skilled in the art will recognize that any of the differently sized supports (selected from the group of supports 302, 304, 306, or 308) could be installed as described above and depicted in FIG. 15. It is further contemplated that with the addition of a second coupler (like coupler 317), multiple extension members (two or more of members 302, 304, 306, or 308) could be used at once to obtain even more height.

It is further contemplated that additional larger embodiments can be used to support articles where the height "h" between the floor or other support surface below, and a lower surface of the article to be mounted (e.g., on a wall) is greater than is shown in FIG. 16. An example where this embodiment might be useful is where a person desires to support an upper cabinet first before installing lower cabinetry (which would enable the use of halves 102 and 104 on a countertop). The basic functionality of this larger embodiment would be the same as for the FIG. 16 embodiment, and the component dimensions (especially in height) have simply been increased to enable the handling tasks involving larger "h" values.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for supporting an object, the system comprising:
   a base;
   a supporting mass mounted on the base;
   a vertically-adjustable support member extendable up from the supporting mass, the vertically-adjustable support member being received through a first collar located above an upper surface of the mass, the first collar including a clutch arrangement, the clutch arrangement configured to allow for the raising and lowering of the vertically-adjustable support member when a lever in the clutch arrangement is actuated, the clutch-lever arrangement further configured to hold the vertically-adjustable support member in an initial, set vertical position when the lever is released; and
   a fine-tuning mechanism connected to, and spaced apart from the first collar, the fine-tuning mechanism being adjustable upward and downward and having an engagement head that is received onto the upper surface of the mass to set an ultimate vertical position of the vertically-adjustable support member resulting in leveling of the object.

2. The system of claim 1 wherein the fine-tuning mechanism includes a threaded rod which is on a substantially parallel axis relative to the vertically-adjustable support member, the threaded rod being received by reciprocating internal threads in a second collar which is connected to and spaced apart from the first collar.

3. The system of claim 2 wherein the threaded rod includes a thumb-screw actuator above the second collar that receives a user action to move the vertically-adjustable support member up or down.

4. The system of claim 1 comprising:
   a protective device configured to be secured atop the vertically-adjustable support member, the protective device configured to engage an undersurface of a supported item and configured to protect the supported item from damage, the protective device being any of padded, cloth, or rubber.

5. The system of claim 1 comprising:
   at least one extension member configured to be installed onto the vertically-adjustable member to extend the height of the vertically-adjustable support member.

6. The system of claim 5 comprising:
   a coupler configured to connect an end of the extension member to a top of the vertically-adjustable support member.

7. The system of claim 6 wherein the coupler has internal threads that receive a threaded top of the vertically-adjustable support member from below and receive a threaded end of the extension member from above.

8. The system of claim 1 comprising:
   a plurality of extension members, each extension member in the plurality having a different length and configured for installation onto the vertically-adjustable support member, each extension member in the plurality enabling a user to extend the vertical height of the vertically-adjustable support member to a different extended height.

9. A system for supporting an object, the system comprising:
   a first corresponding portion;
   a second corresponding portion;
   each of the first and second corresponding portions including:
   a base; and
   a vertically-adjustable support member extendable upwards relative to the supporting base, the vertically-adjustable support member including an adjustment system, the adjustment system configured to allow for the raising and lowering of the vertically-adjustable support member in a first mode, the adjustment system configured to hold the vertically-adjustable support member in place in a second mode;
   the vertically-adjustable support members for each of the first and second corresponding portions configured to together support and level the object and
   the first and second corresponding portions are attachable to form a container.

10. The system of claim 9 wherein the first and second corresponding portions are substantially symmetrical.

11. The system of claim 9 wherein the first and second corresponding portions are made to be securable to one another using one or more latches.

12. The system of claim 11 wherein when the first and second corresponding portions are attached to one another they form a container for including a plurality of implements.

13. The system of claim 11 wherein the first and second corresponding portions are configured such that when secured they together form a substantially cuboid, stackable aggregation.

14. The system of claim 11 wherein the one or more latches on the first and second corresponding portions are on opposite sides of each of the first and second corresponding portions.

15. The system of claim 9 comprising:
   an upwardly-extending mass from which each vertically-adjustable support member extends; and
   a plurality of extension members included in each of the first and second corresponding portions, each extension member in the plurality having a different length and configured for installation onto the vertically-adjustable support member, each extension member in the plurality enabling a user to extend the vertical height of each vertically-adjustable support member to a different extended height to level the object above the first and second corresponding portions.

16. The system of claim 15 wherein each of the first and second corresponding portions includes a fine-tuning arrangement including a drive mechanism received onto the upwardly-extending mass and coupled to the vertically-adjustable support member, the fine-tuning arrangement configured to raise or lower the vertically-adjustable support member and any selected and installed extension member from the plurality as a result of a user actuating the drive mechanism.

17. A system for supporting an object, the system comprising:
   a first portion;
   a second portion configured to be attachable to the first portion to form a container;
   each of the first and second corresponding portions including:
   a base portion including a substantially-flat, floor-engaging surface;
   a vertically-adjustable support member extendable upwards relative to the supporting base, the vertically-adjustable support member including an adjustment system, the adjustment system allowing for raising and lowering of the vertically-adjustable support member; and
   the vertically-adjustable support members for each of the first and second corresponding portions configured to together support and level the object.

18. The system of claim 17 wherein the adjustment system includes a collar including a clutch-lever, the collar receiving the vertically-adjustable support member and allowing the vertically-adjustable support member to be moved up, moved down, and fixed in a plurality of vertical positions.

19. The system of claim 18 wherein a fine-tuning adjustment mechanism is structurally and mechanically connected relative to the collar such that the fine-tuning adjustment mechanism is: (i) spaced-apart from and substantially parallel with the vertically-adjustable support member, and (ii) bears down on a supporting surface above the base.

* * * * *